United States Patent [19]

Furuhashi

[11] Patent Number: 5,414,517
[45] Date of Patent: May 9, 1995

[54] METHOD AND APPARATUS FOR MEASURING THE SHAPE OF GLOSSY OBJECTS

[75] Inventor: Nakatomo Furuhashi, Tsukuba, Japan

[73] Assignees: Agency of Industrial Science & Technology; Ministry of International Trade & Industry, both of Tokyo, Japan

[21] Appl. No.: 36,251

[22] Filed: Mar. 24, 1993

[30] Foreign Application Priority Data

May 1, 1992 [JP] Japan .................. 4-139704

[51] Int. Cl.$^6$ ............................ G01B 11/24
[52] U.S. Cl. .................... 356/376; 250/234
[58] Field of Search ............ 356/376, 4; 250/234

[56] References Cited
FOREIGN PATENT DOCUMENTS

| | | | |
|---|---|---|---|
| 2855877 | 6/1980 | Germany | 356/376 |
| 61-17281 | 5/1986 | Japan. | |
| 0209112 | 9/1991 | Japan | 356/376 |
| 1686305 | 10/1991 | U.S.S.R. | 356/376 |

*Primary Examiner*—Robert P. Limanek
*Assistant Examiner*—David B. Hardy
*Attorney, Agent, or Firm*—Oblon, Spivak, McClelland, Maier, & Neustadt

[57] ABSTRACT

A method of measuring the shape of a glossy object includes the simultaneous illumination of the whole surface of the object by two light sources which are arranged on the same axis a fixed distance apart, light from one of the light sources that is reflected from the glossy object being picked up by image capture means located at the position of the other light source, and from the imaging position of the reflected light thus captured the angle of incidence of the reflected light on the image capture means is calculated and triangulation is used to calculate the spatial location of a light reflection point on the surface of the glossy object.

2 Claims, 4 Drawing Sheets

METHOD AND APPARATUS FOR MEASURING THE SHAPE OF GLOSSY OBJECTS

BACKGROUND OF THE INVENTION

1. Field of the Invention

This invention relates to a method and apparatus for measuring the shape of solid objects that have a high surface glossiness or a mirror surface finish, using an apparatus that has imaging capabilities such as an ITV camera.

2. Description of the Prior Art

In various fields of industry the shape measurement of solid objects is an essential technique for product inspection, process automation and the like. Such products include various product items such as motorcycle mufflers, machined shafts and the like that have a high surface glossiness or a mirror surface finish (hereinafter referred to simply as glossy surface).

Conventional methods of measuring solid shapes are difficult to apply to the measurement of objects such as these, that is, objects that have a glossy surface (hereinafter referred to simply as glossy objects), as conventional methods are directed at the measurement of objects having an irregular reflecting surface.

Examples of representative conventional methods of measuring the shape of solid objects include the stereo camera method in which two cameras are used to obtain an image of the same object and points common to both images are then obtained to derive the three-dimensional shape of the object, and the light section method in which a slit light is projected onto the object and a camera is used to record the locations of the slit light on the surface of the object and thereby obtain the three-dimensional shape.

However, applying these techniques to glossy objects gives rise to the following type of problem. In the case of the stereo camera method, for example, because of the surface glossiness of the object, the images that are obtained include images of the surroundings, and as a result the two images have a different density distribution, making it difficult to detect the common points. In the case of the light section method, because the glossy surface produces a regular reflection of the slit light projected onto the object, in some positions the camera may not be able to obtain an image. This is illustrated in FIG. 5.

FIG. 5 shows a shape measurement system that employs the light section method. In FIG. 5, reference numeral 10 denotes the object of the measurement, 11 is a glossy surface of the object 10, 12 is a slit light projector that can be controlled to project slit light at any desired angle, and 13 is an ITV camera for recording the position of the slit light on the surface of the object 10. The slit light projector 12 and ITV camera 13 are both arranged on axis $X_3$, the optical axes of the slit light projector 12 and ITV camera 13 coincide with axes and $Y_3$ and $Y'_3$ which are perpendicular to axis $X_3$. The distance between axis $Y_3$ and axis $Y'_3$ is $B_3$, and the origin is 0.

In this arrangement, the slit light $l_{31}$ projected from the slit light projector 12 onto the measurement object 10 at an angle of $a_{31}$ to axis $X_3$ is regularly reflected from point $P_{31}$ on the glossy surface 11 to become slit light $l'_{31}$. The slit light $l'_{31}$ impinges on the ITV camera 13 and focusses into an image at a point $p_{31}$ on the image formation plane. As the surface of the measurement object 10 is a glossy surface 11, in accordance with the laws of reflection the angle of incidence $b_{31}$ and reflex angle $b'_{31}$ relative to the normal $N_{31}$ of the tangent plane (not shown) at point $P_{31}$ will be equal. Therefore the position of point $P_{31}$ on glossy surface 11 can be calculated by triangulation, using the slit light angle of projection $a_{31}$, distance $B_3$, the slit light imaging position $p_{31}$ and the focal length of the ITV camera 13.

Next, if angle $a_{32}$ is the angle of slit light projection relative to axis $X_3$, if slit light $l_{32}$ is projected at point $P_{32}$ on the glossy surface 11, with the relationship between the angle of incidence $b_{32}$ and reflex angle $b'_{32}$ relative to the normal $N_{32}$ of the tangent plane at point $P_{32}$ being $b_{32}=b'_{32}$, it will be regularly reflected to become slit light $l'_{32}$. In this state slit light $l'_{32}$ will not impinge on the lens aperture plane of the ITV camera 13, meaning that it is impossible to observe point $P_{32}$ with the ITV camera 13.

Thus, when the conventional light section method is applied to the measurement object 10, scanning slit light over the whole surface of the measurement object 10, only those parts of the glossy surface 11 that satisfy the condition angle of slit light incidence = reflex angle (one point in the case of a convex object), and it is not possible to measure the whole shape of the measurement object 10. One way of obtaining the full three-dimensional shape of the measurement object 10 with the above shape measurement method is to move the above shape measurement apparatus relative to the measurement object 10, and measure by scanning with the slit light at each move. However, in order to measure one point with such a method it is necessary to scan the whole surface of the measurement object 10 with slit light. Also, when a scanning type image capture device is used such as the ITV camera 13 used in the example of a conventional apparatus, each slit light scanning angle would require measurement time for one frame obtained by the ITV camera 13. Thus, there has been the problem that the measurement time is increased.

Other shape measurement methods have been tried which attempt to directly measure the glossy surface of an object. The light projection method is one example. The light projection method consists of backlighting a rotating object and establishing the three-dimensional shape of the object from the outline formed by the shadow thus produced. However, the only information provided by this method is the outline of the object, and as such it is impossible, in principle, to measure the internal shape of the outline.

JP-B-61-17281 discloses a method of using circularly polarized light to detect the orientation of a glossy surface. This method consists of setting up numerous circularly polarized light sources around the glossy surface and using an image capture device equipped with polarized light detection means to measure light thus reflected from the glossy surface and thereby establish the shape of the object. Drawbacks of this method are that it requires a large number of circularly polarized light sources and complex equipment such as an image capture device equipped with polarized light detection means, and also involves the need to carry out complex calculations to find the orientation of a glossy surface.

Thus, while various methods have been tried aimed at measuring the shape of glossy objects, with each of the methods having drawbacks, as yet no effective means has been developed which can accomplish such shape measurement.

SUMMARY OF THE INVENTION

The object of the present invention is therefore to provide a method and apparatus for measuring the three-dimensional shape of glossy objects using a simple apparatus.

The shape measurement of a glossy object in accordance with the present invention comprises the simultaneous illumination of the whole surface of the measurement object by two light sources which are arranged on the same axis a fixed distance apart, light from each of the light sources that is regularly reflected from the glossy object is picked up by image capture means located at the position of the other light source, and from the imaging position of the reflected light thus captured the angle of incidence of the reflected light on the image capture means is calculated and triangulation is used to calculate the spatial location of a light reflection point on the surface of the glossy object.

In triangulation, the location of a point in three-dimensional space is established by knowing one side of a triangle and the angles at each end of that side. Light reflecting from an object is comprised of a regular reflection component and a diffuse reflection component. In the case of a glossy surface the regular reflection component is the dominant one, and the angle of incidence equals the reflex angle relative to the normal of the tangent plane on the glossy surface.

The present invention uses the above geometric and physical characteristics to perform three-dimensional shape measurement of an object having a glossy surface. Therefore, because the present invention detects the angle of projection and the angle of incidence solely from the measurement values of the image capture means, it does not require the detection of the scanning angle of the slit light used in the light section method. Also, because the light is projected over the whole surface of the measurement object at one time, the position of points on the surface of the object can be measured without any need for slit light scanning.

The three-dimensional shape of a measurement object is measured by moving the light sources and image capture means relative to the object and calculating the three-dimensional shape from the multiple points thereby obtained. In this way, it becomes possible to measure the three-dimensional shape of a measurement object having a glossy surface by using a simple apparatus consisting of two fixed light sources and two image capture devices, and simple geometrical and optical principles.

In the present invention, the light from the light source only needs to be projected once, and the imaging position data from the fixed cameras are used to calculate the angle of light projection relative to the measurement object, and the angle of light incidence on the ITV cameras. This makes possible high-speed measurement without the mechanical drive mechanisms required for slit light scanning in the conventional technique, and without the appurtenant slit light scanning angle detectors and the like.

Further features of the invention, its nature and various advantages will be more apparent from the accompanying drawings and following detailed description of the invention.

DESCRIPTION OF THE PREFERRED EMBODIMENT

Figure 1:
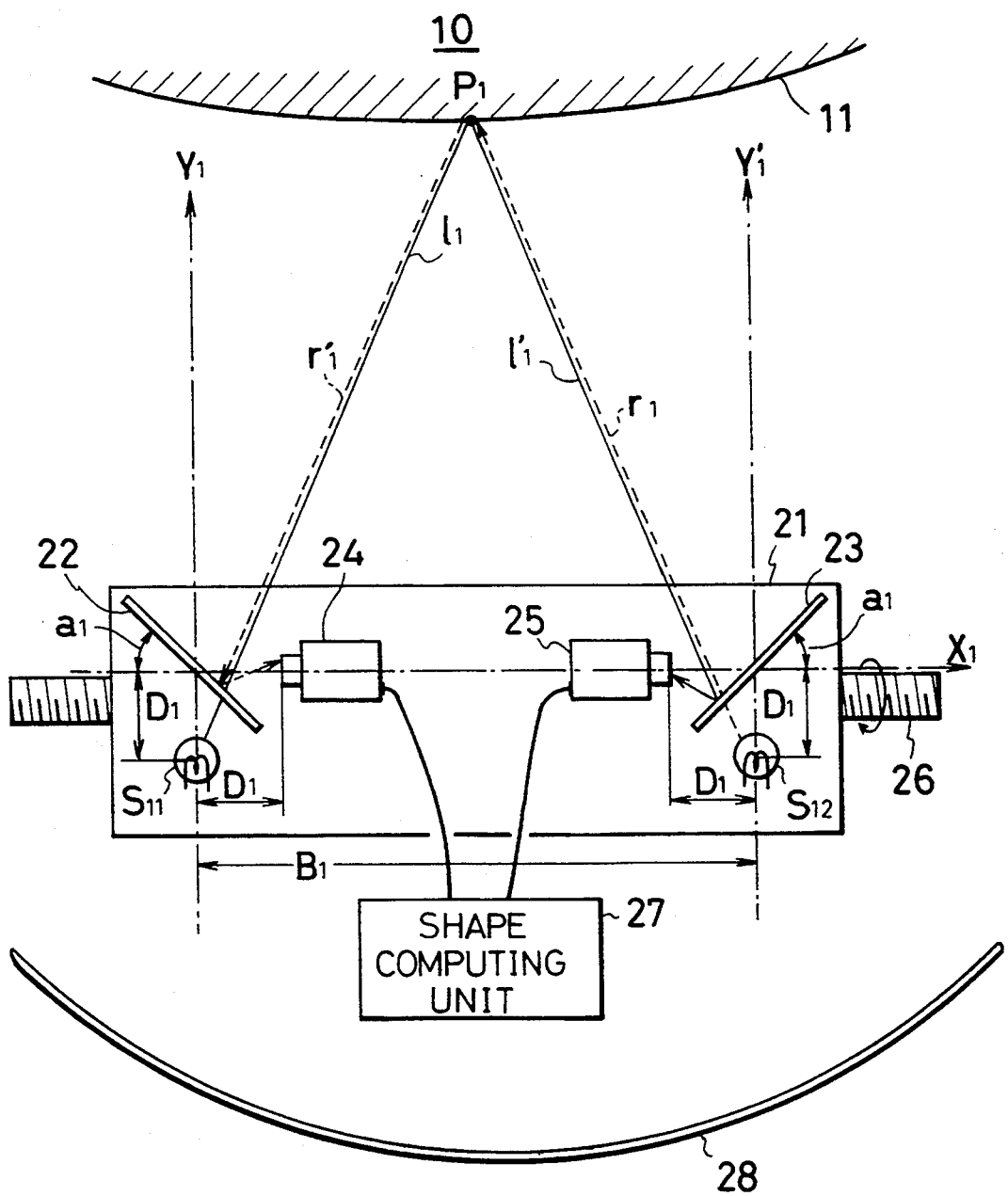
FIG. 1 is a schematic diagram showing a first embodiment of the object shape measurement apparatus according to the present invention.
Figure 5:
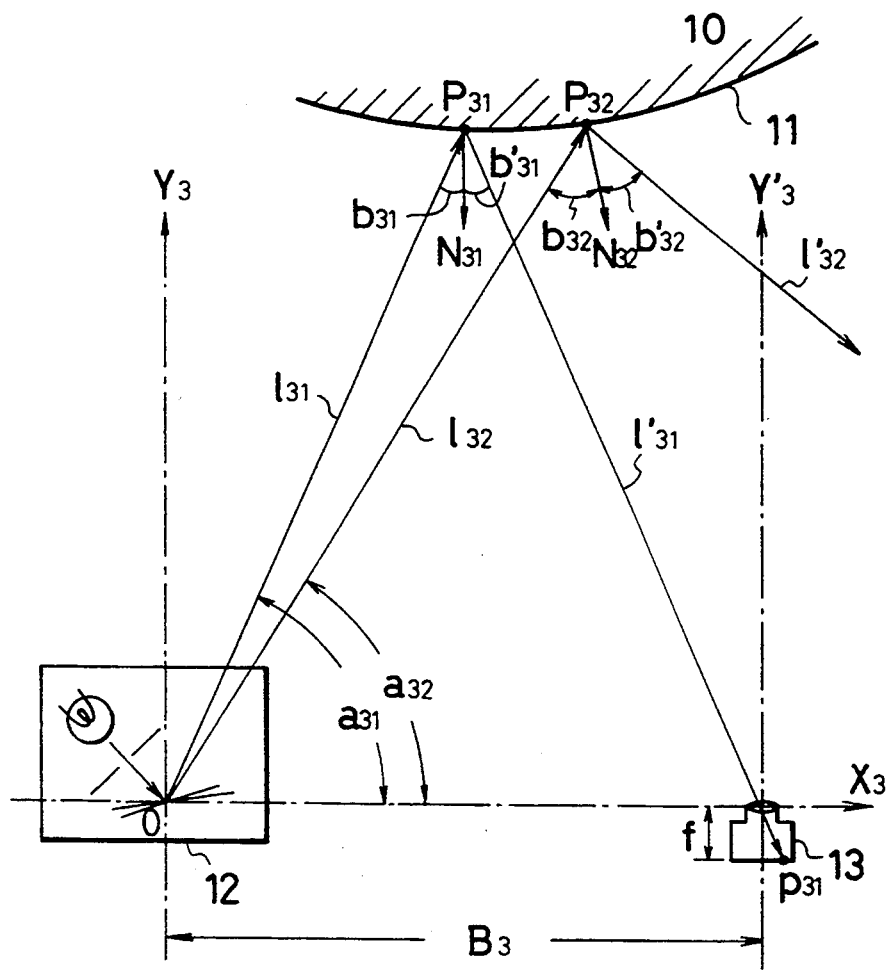
FIG. 5 is a diagram that illustrates the problem points of an object shape measurement apparatus based on the conventional light section method.

FIG. 1 shows the arrangement of a first embodiment of the invention. With reference to FIG. 1, in which parts that are the same as those of FIG. 5 have been given the same reference notation, reference numeral 21 denotes a frame, 22 and 23 are semi-reflecting mirrors, $S_{11}$ and $S_{12}$ are diffused spot light sources, 24 and 25 are image capture means, constituted by ITV cameras which are both mounted on the frame 21. Other parts are a frame moving mechanism 26, a shape computing unit 27 and a disturbing light shielding means 28 such as a blackout curtain or the like. The frame 21 can be moved along axis $X_1$ by a rotating mechanism of the frame moving mechanism 26.

Axis $X_1$ in the longitudinal direction of frame 21 and, perpendicular to axis $X_1$, axis $Y_1$ and axis $Y'_1$ are selected as the measurement system coordinates. Axis $Y_1$ and axis $Y'_1$ are separated by a distance $B_1$. The semi-reflecting mirrors 22 and 23 are attached to the frame 21 so as to be symmetrically arranged so the centers of the mirrors are on the points of intersection between axis $X_1$ and axis $Y_1$, and axis $X_1$ and axis $Y_{40\ 1}$, respectively, and the mirrors are each at an angle $a_1$ to the axis $X_1$. The ITV camera image capture means 24 is attached to the frame 21 so that it faces the semi-reflecting mirror 22 from which it is separated by a distance $D_1$, so that the optical axis thereof coincides with axis $X_1$. Similarly, the ITV camera image capture means 25 is attached to the frame 21 so that it faces the semi-reflecting mirror 23 from which it is separated by the same distance $D_1$, so that the optical axis thereof coincides with axis $X_1$.

In the embodiment of FIG. 1, when the image capture means 24 and 25 are each arranged on axis $X_1$ and the diffused spot light sources $S_{11}$ and $S_{12}$ are arranged on axis $Y_1$ and axis $Y'_1$, the semi-reflecting mirrors 22 and 23 will be set at an angle $a_1$ of 45 degrees to the axis $X_1$. Thus, the relationship between the angle $a_1$ at which the semi-reflecting mirrors are set and the position of the cameras is as follows.

The angle between axis $Y_1$ and the optical axis of image capture means 24 is $2 \times (90 - \text{angle } a_1)$.

The angle between axis $Y'_1$ and the optical axis of image capture means 25 is $2 \times (90 - \text{angle } a'_1)$ This means that the angle between axis $Y_1$ and the optical axis of the image capture means 24 has to be set to twice the angle between axis $Y_1$ and the semi-reflecting mirror. Thus, if the angle between axis $Y_1$ and the semi-reflecting mirror is 45 degrees the angle between axis $Y_1$ and the optical axis of the camera will be 90 degrees. That is, axis $X_1$ and the optical axis of image capture means 24 coincide. This relationship also applies with respect to axis $Y'_1$ and image capture means 25.

The diffused spot light sources $S_{11}$ and $S_{12}$ are affixed to the frame 21 on axis $Y_1$ and axis $Y'_1$ to the rear of semi-reflecting mirrors 22 and 23, arranged so that they are each separated from the center of the respective mirror by a distance $D_1$. It is the same distance $D_1$ from the centers of the semi-reflecting mirrors 22 and 23 to the image capture means 24 and 25 and to the diffused spot light sources $S_{11}$ and $S_{12}$, and spatially diffused spot light source $S_{11}$ and image capture means 24, and diffused spot light source $S_{12}$ and image capture means 25, are arranged in the same position.

The diffused spot light sources may be incandescent light bulbs, fluorescent lamp bulbs, ring-shaped fluorescent lamps, light-emitting diodes or the like. If ring-shaped fluorescent lamps are used, positioning the camera in the center thereof will mean that both are arranged in the same position. With the disturbing light shielding means 28 being used to shield the measurement object 10 from the effect of disturbing light, the measurement object 10 is simultaneously irradiated by diffused spot light sources $S_{11}$ and $S_{12}$ and the reflected light from the object is recorded by the ITV camera image capture means 24 and 25.

The light projected at the measurement object 10 from the diffused spot light source $S_{11}$ passes through the semi-reflecting mirror 22 and illuminates the whole of the glossy surface 11 of the measurement object 10. In this case the measurement object 10 is the glossy surface 11, so that in accordance with the laws of optical reflection the incident light on the measurement object 10 is totally reflected by the glossy surface 11. Of the reflected light, only the designated incident and reflection light path light is reflected once more by the semi-reflecting mirror 23 and into the ITV camera image capture means 25.

In the case of the illustrated embodiment, for example, of the light projected from the diffused spot light source $S_{11}$ onto the measurement object 10, only light passing through a designated light path, which is light passing along the incident light path $l_1$ to the reflection point $P_1$ on the glossy surface 11, and then back through reflected light path $l'_1$ enters the image capture means 25. Light projected from the diffused spot light source $S_{12}$ that passes through the semi-reflecting mirror 23 and the other way along the above light path $l_1$-$l'_1$, that is only light that passes along incident light path $r_1$, reflection point $P_1$ and reflected light path $r'_1$ is reflected into the ITV camera image capture means 24 by the semi-reflecting mirror 22.

The reflection point $P_1$ images obtained by the image capture means 24 and 25 are each transmitted as image signals to the shape computing unit 27. From the image signals of the image capture means 24 and 25, the shape computing unit 27 first calculates the angle of incidence on reflected light path $r'_1$ ITV camera image capture means 24 and the angle of incidence on reflected light path $l'_1$ ITV camera image capture means 25, and then uses the values of distances $B_1$ and $D_1$, and the focal length f (not shown) of the ITV cameras to calculate the spatial position of the reflection point $P_1$ based on the triangulation principle. The three-dimensional shape of the measurement object 10 is found by using the rotating mechanism of the frame moving mechanism 26 to move the frame 21 along axis $X_1$ while performing the above measurement at each step of the movement, and then using the shape computing unit 27 to link up the positions of the numerous points thus measured.

Figure 2:
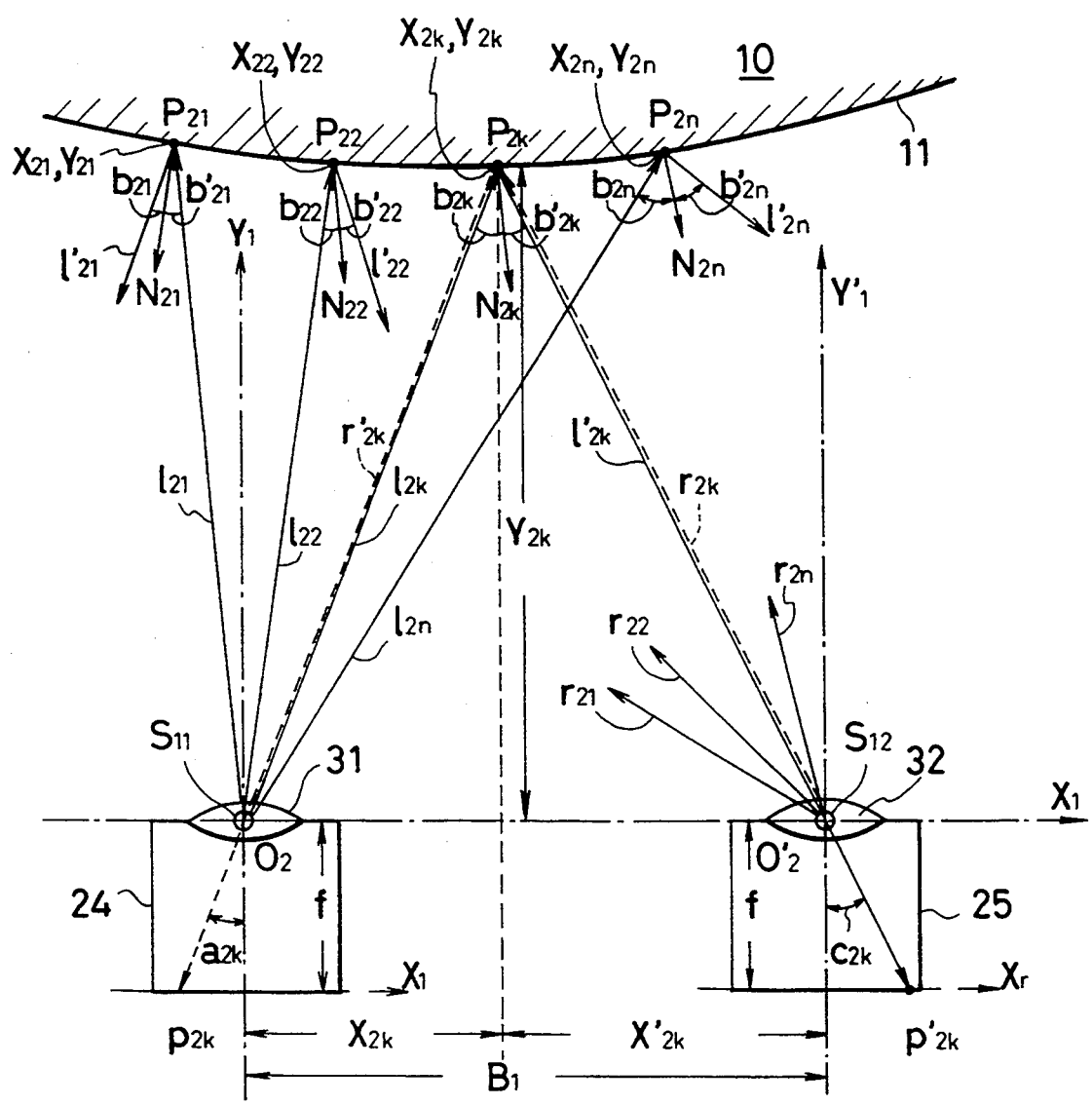
FIG. 2 is a diagram illustrating the principle on which the shape measurement of an object is based.

FIG. 2 illustrates the shape measurement principle used by the present invention; in this drawing, parts that are the same as those of FIG. 1 have been given the same reference notation. In FIG. 2, ITV camera image capture means 24 and 25 are both arranged on axis $X_1$. The optical paths of the image capture means 24 and 25 are each perpendicular to the axis $X_1$, being coincident with axis $Y_1$ and axis $Y'_1$ respectively. Axis $Y_1$ and axis $Y'_1$ are separated by a distance $B_1$. The principal points of lenses 31 and 32 of the image capture means 24 and 25 are located at the point of intersection $O_2$ between axis $X_1$ and axis $Y_1$ and the point of intersection $O'_2$ between axis $X_1$ and axis $Y'_1$. Diffused spot light source $S_{11}$ and diffused spot light source $S_{12}$ are also located at points of intersection $O_2$ and $O'_2$ facing axis $Y_1$ and axis $Y'_1$. With respect to the optical relationships, this configuration is equivalent to that of the embodiment shown in FIG. 1.

In this arrangement, light projected from the diffused spot light source $S_{11}$ undergoes a total spatial diffusion and irradiates the measurement object 10. With the angle of incidence equalling the reflex angle relative to the normal of the tangent plane on the glossy surface, the light projected onto the measurement object 10 produces a regular reflection from the glossy surface 11. That is, light projected from diffused spot light source $S_{11}$ along paths $l_{21}, l_{22}, ..., l_{2n}$ is regularly reflected with the angle of incidence and reflex angle in each case being an equal angle relationship $b_{21}=b'_{21}, b_{22}=b'_{22}, b_{2n}=b'_{2n}$ relative to the normal $N_{21}, N_{22}, ..., N_{2n}$ of the tangent plane (not shown) at reflection points $P_{21}(X_{21}, Y_{21}), P_{22}(X_{22}, Y_{22}), ..., P_{2n}(X_{2n}, Y_{2n})$ on the glossy surface 11, and becomes reflected light of light paths $l'_{21}, l'_{22}, ..., l'_{2n}$.

Of the incident and reflected light, only the light of a designated light path enters the ITV camera image capture means 25. That is, only light along a light path $l_{2k}$ that links diffused spot light source $S_{11}$ and reflection point $P_{2k}(X_{2k}, Y_{2k})$ and has a relationship of equality between angle of incidence $b_{2k}$ and reflex angle $b'_{2k}$, and a light path $l'_{2k}$ that links the principal point of the image capture means 25 ITV camera lens 32 and reflection point $P_{2k}(X_{2k}, Y_{2k})$ enters the ITV camera image capture means 25 (this is provided that the lens aperture is sufficiently small relative to the length of the light path). Light impinging on the ITV camera image capture means 25 forms an image at a point $p'_{2k}$ on film coordinate $x_r$. Light of the other light paths $l'_{21}, l'_{22}, l'_{2n}$ does not enter the ITV camera image capture means 25 even if reflected by the glossy surface 11, therefore there is no related image formation.

Owing to the reversible nature of the glossy surface 11 with respect to light reflection, the light projected at the measurement object 10 from the diffused spot light source $S_{12}$ passes along the same path in the opposite direction. Specifically, only light from the light path $r_{2k}$ that links diffused spot light source $S_{12}$ and reflection point $P_{2k}(X_{2k}, Y_{2k})$ and the light path $r'_{2k}$ that links the principal point of the image capture means 24 ITV camera lens 31 and reflection point $P_{2k}(X_{2k}, Y_{2k})$ enters the ITV camera image capture means 24 and forms an image at a point $p_{2k}$ at film coordinate $x_1$. Light of the other light paths $r'_{21}, r'_{22}, ..., t'_{2n}$ does not enter the ITV camera image capture means 24 and form an image even if reflected by the glossy surface 11.

If f is the focal length of each of the ITV cameras 24 and 25, based on the illustrated relationships the angles of incidence $a_{2k}$ and $C_{2k}$ on the ITV cameras 24 and 25 of light paths $r'_{2k}$ and $1'_{2k}$ can be obtained by the following equations.

$$\tan a_{2k} = p_{2k}/f = X_{2k}/Y_{2k} \qquad (1)$$

$$\tan C_{2k} = p'_{2k}/f = X'_{2k}/Y_{2k} \qquad (2)$$

If here $X'_{2k} = B_1 - X_{2k}$ is used, then $$B_1 = X_{2k} + X'_{2k} = Y_{2k} \tan a_{2k} + Y_{2k} \tan c_{2k} \qquad (3)$$

If equations (1) and (2) are substituted into equation (3), then the position of point $P_{2k}(X_{2k}, Y_{2k})$ is $$Y_{2k} = B_1 f(1/P_{2k} + P'_{2k}) \qquad (4)$$

$$X_{2k} = Y_{2k} \tan a_{2k} = Y_{2k} \tan p_{2k}/f \qquad (5)$$

Thus, in accordance with the above the position of a point $P_{2k}(X_{2k}, Y_{2k})$ on the measurement object 10 can be calculated by measuring positions $p_{2k}$ and $p'_{2k}$ on the film coordinates of the ITV cameras 24 and 25.

Generally, the projection angle of the light from the light source and the angles of incidence with respect to ITV cameras 24 and 25 are required to find the position of point $P_{2k}$ on the measurement object 10. However, the present invention utilizes the reversible nature of light reflection by the glossy surface 11, that is, the relationship of equality between angle of incidence and reflex angle $b_{2k} = b'_{2k}$ relative to the normal $N_{2k}$ to obtain the angles of incidence $a_{2k}$ and $C_{2k}$ of the light on the ITV camera image capture means 24 and 25, and the projection angle of light from the light source.

The three-dimensional shape of the measurement object 10 is obtained by moving the two ITV cameras 24 and 25 and the two diffused spot light sources $S_{11}$ and $S_{12}$ along the axis $X_1$ while maintaining the spatial positional relationship therebetween and performing the above measurements to thereby obtain the position of reflection point $P_{2k}$ on the measurement object 10, and then joining the plurality of points thus obtained, using linear interpolation or spline functions or the like.

Figure 3:
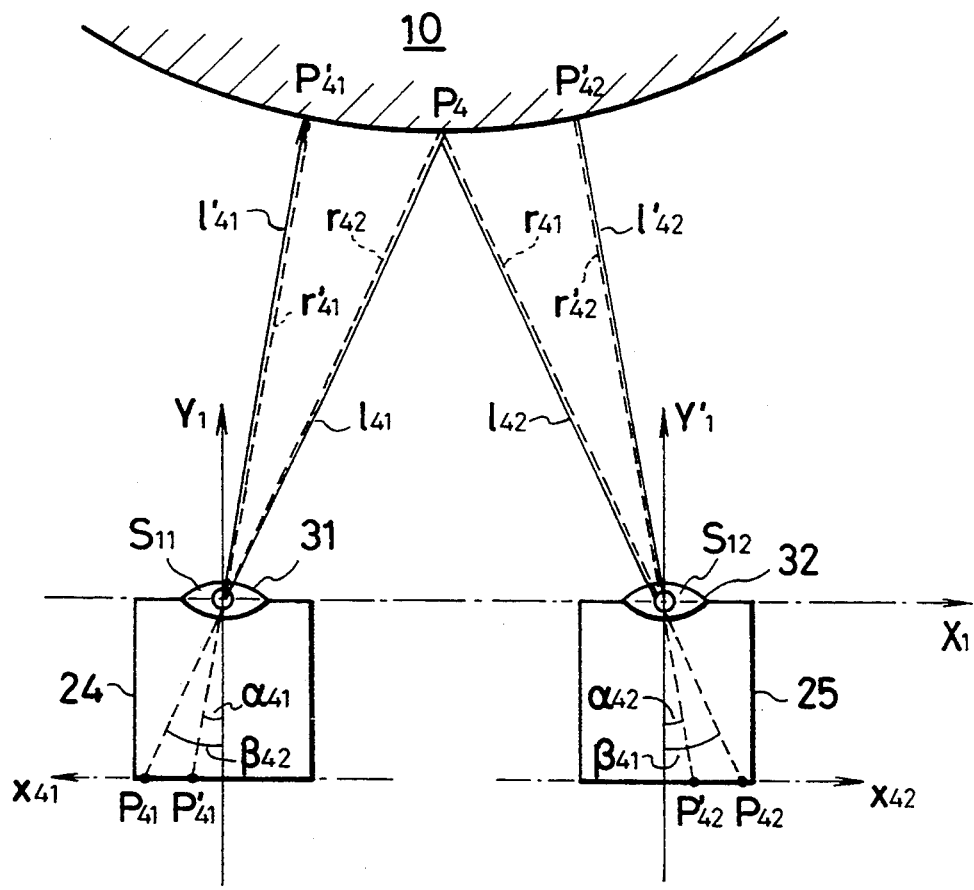
FIG. 3 is a diagram illustrating the entry into the ITV cameras of reflected light from an object.

When the object is convex, as shown in FIG. 3, the reflected light entering the ITV camera image capture means 24 and 25 from the glossy surface 11 may include not only reflected light $r_{42}$ of the light beam $l_{42}$ from the light source $S_{12}$, but also reflected light $r'_{41}$ of the light beam $l'_{41}$ from the light source $S_{11}$. One way of excluding reflected light $r'_{41}$ and $r'_{42}$ is to use image coordinates of the imaging plane of the ITV cameras 24 and 25, as shown in FIG. 3, whereby, owing to the fact that the object 10 has a convex shape, the angle of incidence $\alpha$ of reflected light from the own-side light source will always be smaller than the angle of incidence $\beta$ of reflected light from the other-side light source. That is, with respect to angles of incidence on the ITV camera image capture means 24 and 25, $\alpha_{41} < \beta_{42}$ and $\alpha_{42} < \beta_{41}$ will always obtain. The shape computing unit 27 can calculate the angles of incidence of each of the image formation points $p'_{41}, P_{41}$, and $P'_{42}, P_{42}$ from the image signals of the ITV cameras 24 and 25, and can detect reflected light $r_{42}$ and $r_{41}$ by excluding the points $p'_{41}$ and $p'_{42}$ that have a smaller angle of incidence.

Or, instead of activating the two light sources $S_{11}$ and $S_{12}$ simultaneously they could be alternated, with light source $S_{12}$ being off while light source $S_{11}$ is on, or vice-versa. When for example when light source $S_{11}$ was on and light source $S_{12}$ was off, only reflected light from light source $S_{11}$ would enter ITV camera 25, and when light source $S_{12}$ was on and light source $S_{11}$ off, only reflected light from light source $S_{12}$ would enter ITV camera 24. With this arrangement, detection only of reflected light from the other-side light source could be accomplished using camera signals generated in synchronization with the on/off operation of the light sources.

Another way would be to use light sources which produce light of different wavelengths, such as a light source $S_{11}$ that produced red light and a light source that produced green light, for example, and providing the each of the ITV cameras with an appropriate filter that only transmits light of the requisite wavelength, thereby enabling ITV camera image capture means 24 to detect only reflected light from light source $S_{12}$, and ITV camera image capture means 25 to detect only reflected light from light source $S_{11}$.

In the above embodiment ITV cameras are used as the image capture means. However, other devices having imaging capabilities such as CCD cameras or line sensors, or a system device that uses semiconductor optical detectors such as PSD can also be applied.

Figure 4:
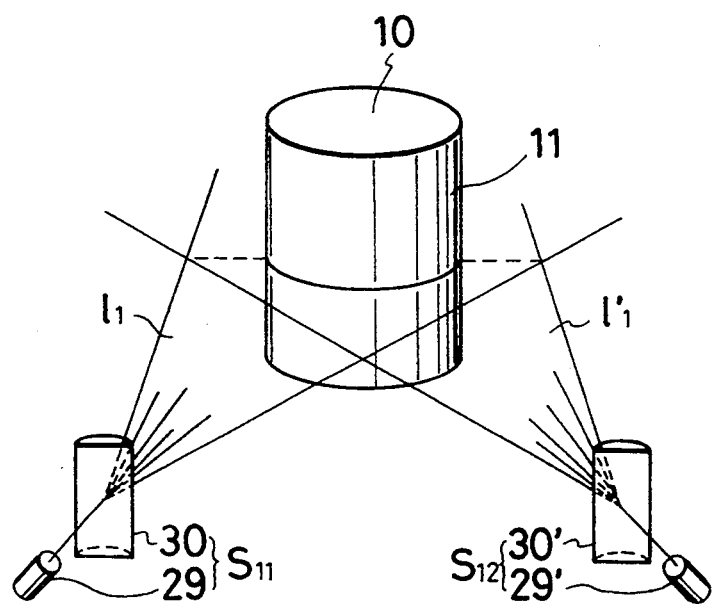
FIG. 4 is a diagram showing measurement being conducted by scanning an object with laser beams.

Similarly, while in the above embodiment diffused spot light sources $S_{11}$ and $S_{12}$ are used, even if horizontal slit light sources are used the principle of the invention will be the same, as long as two sets of light sources and image capture devices located at the same positions are used. The same also applies to techniques of scanning light sources in a fan-shaped or flat beam configuration. As shown in FIG. 4, for example, with $S_{11}$ and $S_{12}$ as the light sources, laser light sources 29 and 29' and cylindrical lenses 30 and 30' are used to produce fan-shaped light beams $l_1$ and $l'_1$ parallel to the X axis and perpendicular to the Y axis, and when a glossy surface 11 of a measurement object 10 is parallel to the Y axis, the object is subjected to one line of irradiation. When there is no glossy surface 11 parallel to the Y axis, the fan-shaped light beam can be rotated to the vertical for measurement scanning in the direction of the Y axis. This is irradiation of an object by flat beams of light, and provides the same effect as irradiation by an equivalent diffused spot light source arrangement.

In the above embodiment the three-dimensional shape measurement of the object 10 is accomplished by using the frame moving mechanism 26 to move the various measuring devices on the frame 21. However, relatively speaking this can be accomplished by an equivalent arrangement in which the measuring devices are stationary and the measurement object 10 is moved instead.

As described in the foregoing, the present invention uses two sets of light sources and image capture devices fixedly arranged on the same axis in a matching spatial positional configuration, the light projected by the light source of one set and reflected by the object is imaged by the image capture means of the other set, and the principle of triangulation is used to calculate the three-dimensional shape of the object. The present invention does this without needing the movable light source scanning means or large number of light sources required by conventional methods, and by using a plain arrangement and simple computation process. It also provides high-precision measurement results and a system arrangement that is highly reliable.

Obviously, numerous modifications and variations of the present invention are possible in light of the above teachings. It is therefore to be understood that within the scope of the appended claims, the invention may be practiced otherwise than as specifically described herein.

What is claimed is:

1. A method of measuring shapes of glossy objects, comprising the steps of:
   (a) arranging two diffused light spot sources a fixed distance apart from one another along a first axis;
   (b) arranging imaging means having imaging planes along a second axis which is parallel to said first axis;
   (c) selecting a measuring position on a measuring object;
   (d) obtaining an image of light that has been projected from said diffused spot light sources and reflected from measurement object, via said imaging means which are not irradiated by said light;
   (e) utilizing a position at which said image of said light is formed on said imaging planes of said imaging means to calculate an angle of incidence of said light which has been reflected onto said imaging means;
   (f) utilizing said angle of incidence of said light reflected onto said imaging means to calculate spatial locations of light reflection points on said measurement object;
   (g) repeating steps (a)–(f) while changing said measuring position;
   (h) utilizing said spatial locations of a plurality of said light reflection points thereby obtained to calculate a three dimensional shape of said measurement object; and
   utilizing semi-reflecting mirror means to render each of said imaging means at a spatial location proximate to a corresponding one of said diffused spot light sources.

2. A shape measurement apparatus for measuring shapes of glossy objects, comprising:
   a frame;
   first and second diffused spot light sources arranged a fixed distance apart from one another on said frame along a first axis;
   first imaging means for imaging light projected from said second light source and reflected from a measurement object;
   second imaging means for imaging light projected from said first light source and reflected from said measurement objects;
   frame moving means for moving said frame while maintaining positional relationships of said first and second light sources and said first and second imaging means;
   means for utilizing video signals of said first and second imaging means to detect an angle of incidence of said light reflected onto said first and second imaging means each time said frame is moved by said frame moving means;
   shape calculating means which utilizes each angle of incidence thereby detected to calculate positions of light reflection points on said measurement object, and which utilizes said positions of said light reflection points to calculate a three-dimensional shape of said measurement object; and
   first and second semi-reflecting mirrors positioned at angles of 45° with respect to said first axis, wherein said first and second imaging means are arranged along a second axis which is parallel to said first axis and are each separated from respective first and second semi-reflecting mirrors by a distance that is equal to a distance from each of said first and second semi-reflecting mirrors to respective first and second light sources.

* * * * *